US007323867B2

(12) United States Patent
Ueoka

(10) Patent No.: US 7,323,867 B2
(45) Date of Patent: Jan. 29, 2008

(54) APPARATUS WHICH DETECTS THE THICKNESS OF A SHEET OF PAPER SUCH AS A BANK NOTE

(75) Inventor: Tadashi Ueoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 10/108,897

(22) Filed: Mar. 29, 2002

(65) Prior Publication Data

US 2002/0110396 A1    Aug. 15, 2002

Related U.S. Application Data

(63) Continuation of application No. PCT/JP99/06443, filed on Nov. 18, 1999.

(51) Int. Cl.
*G01B 7/06* (2006.01)
*G01B 7/14* (2006.01)
*B65H 7/02* (2006.01)

(52) U.S. Cl. ............. 324/229; 324/207.16; 271/265.04

(58) Field of Classification Search ........ 324/228–243, 324/207.26; 400/56; 271/262–263, 265.04
See application file for complete search history.

(56) References Cited

U.S. PATENT DOCUMENTS

| | | | | |
|---|---|---|---|---|
| 4,061,938 | A | * | 12/1977 | Hashimoto et al. ......... 310/168 |
| 4,550,252 | A | * | 10/1985 | Tee ........................ 250/223 R |
| 5,437,445 | A | * | 8/1995 | Chang et al. ............... 271/263 |
| 5,712,804 | A | * | 1/1998 | Elbling ....................... 702/170 |
| 5,806,992 | A | | 9/1998 | Ju |
| 5,966,559 | A | * | 10/1999 | May et al. .................... 399/45 |

FOREIGN PATENT DOCUMENTS

| | | | |
|---|---|---|---|
| EP | 0 805 339 | | 11/1997 |
| JP | 53-121097 | | 9/1978 |
| JP | 3-46810 | | 4/1991 |
| JP | 5-27045 | | 2/1993 |
| JP | 5-85643 | | 4/1993 |
| JP | 7-37476 | | 2/1995 |
| JP | 7-111124 | | 4/1995 |
| JP | 07111124 | A * | 4/1995 |
| JP | 10-62109 | | 3/1998 |
| JP | 10-87114 | | 4/1998 |
| WO | WO 86/00160 | | 1/1986 |

\* cited by examiner

*Primary Examiner*—Reena Aurora
*Assistant Examiner*—David M Schindler
(74) *Attorney, Agent, or Firm*—Kratz, Quintos & Hanson, LLP

(57) ABSTRACT

A thickness detecting apparatus comprises a printed board in a part of which a coil is patterned, a detection roller which is disposed near the coil, which detects thickness of a sheet P of paper as a displacement amount, and a thickness detection circuit mounted on the surface of the printed board, which supplies a high frequency signal to the coil via a wiring pattern formed on the surface of the printed board and detects the amplitude of the high frequency signal which changes according to the displacement amount of the detection roller as a thickness of the sheet P of paper.

2 Claims, 9 Drawing Sheets

FIG.2
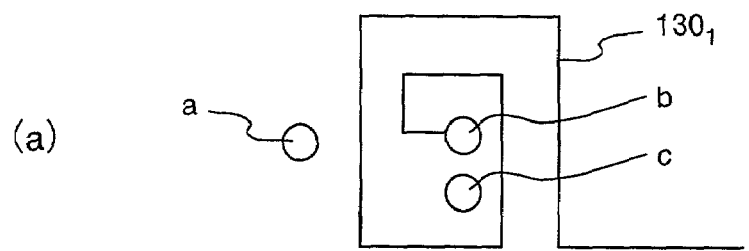
(a)
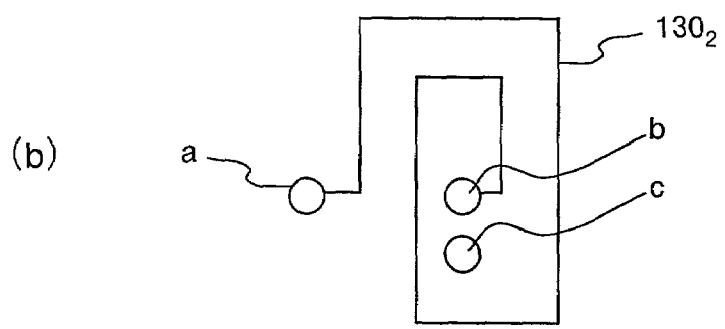
(b)
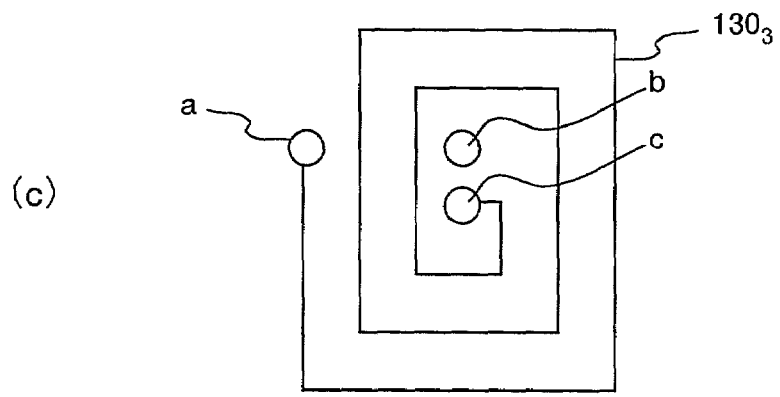
(c)
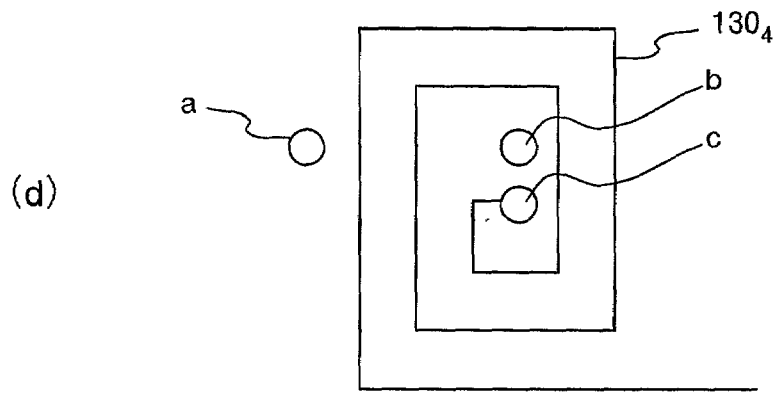
(d)

APPARATUS WHICH DETECTS THE THICKNESS OF A SHEET OF PAPER SUCH AS A BANK NOTE

This application is a continuation of international application PCT/JP99/06443 filed on Nov. 18, 1999.

TECHNICAL FIELD

The present invention relates to a thickness detecting apparatus which detects the thickness of a sheet of paper such as a bank node.

BACKGROUND ART

An ATM (Automatic Teller Machine) which receives/discharges banknotes at a banking institution such as a bank has therein a thickness detecting apparatus which detects the thickness of a bank note to screen the bank note. As it is known, an ATM of this kind is becoming smaller and smaller year after year and, accordingly, reduction in the size of the thickness detecting apparatus is in increasing demand.

FIG. 7(a) is a side view showing the configuration of a conventional thickness detecting apparatus 10. The thickness detecting apparatus 10 shown in the drawing is an apparatus which is disposed above a carrying path M and detects thickness $t_1$ and $t_2$ of sheets P of paper carried in the direction X of the carrying path M. In the thickness detecting apparatus 10, a casing 11 houses the components. A board 12 is attached to attachment bases 11b and 11c of the casing 11. A supporting roller 13 is disposed rotatably on the right side of an opening 11a of the casing 11 to support a detection roller 15 via an arm 14.

The detection roller 15 is disposed in the opening 11a so that a part of it is projected toward the carrying path M side, and rotatably attached to the tip of the arm 14. The detection roller 15 is rotated in a state where it is in contact with the sheet P of paper, and displaced in the direction Z in accordance with the thickness of the sheet P of paper. That is, the detection roller 15 is a roller which detects the thickness of the sheet P of paper as a displacement amount.

A potentiometer 16 is disposed on the left side of the opening 11a and outputs a voltage according to the rotation amount of a rotary shaft 16a. A linking member 17 links the detection roller 15 and the potentiometer 16. Specifically, one end 17a of the linking member 17 is coupled to a shaft 15a of the detection roller 15, and the other end 17b of the linking member 17 is coupled to the rotary shaft 16a of the potentiometer 16. Specifically, the displacement amount in the direction Z of the detection roller 15 is transmitted to the rotary shaft 16a of the potentiometer 16 via the linking member 17 and detected as the rotation amount (voltage) of the rotary shaft 16a by the potentiometer 16.

In the configuration, when the sheet P of paper is carried in the direction X, the detection roller 15 is rotated in a state where it is in contact with the surface of the sheet P of paper and is displaced in the direction Z in accordance with the thickness $t_1$ (or thickness $t_2$) of the sheet P of paper by using the supporting roller 13 as a rotary shaft. Interlockingly with the displacement of the detection roller 15, the rotary shaft 16a of the potentiometer 16 rotates in a direction A. The rotation amount of the rotary shaft 16a corresponds to the thickness $t_1$ (or thickness $t_2$) of the sheet P of paper. A voltage according to the rotation amount of the rotary shaft 16a is output from the potentiometer 16 and is converted to the thickness $t_1$ (or thickness $t_2$) of the sheet P of paper by a not-illustrated detection circuit.

FIG. 7(b) is a side view showing the configuration of a conventional thickness detecting apparatus 20. The thickness detecting apparatus 20 shown in the diagram is another configuration as an example and is disposed above the carrying path M. In the thickness detecting apparatus 20, a casing 21 houses the components. A board 22 is attached to an attachment bases 21b and 21c of the casing 21. A supporting roller 23 is rotatably disposed near an opening 21a of the casing 21 to support a detection roller 25 via an arm 24.

The detection roller 25 is disposed in the opening 21a so that a part of it is projected toward the carrying path M side and is rotatably attached to the tip of the arm 24. The detection roller 25 is rotated in a state where it is in contact with the sheet P of paper and is displaced in the direction Z in accordance with the thickness of the sheet P of paper. That is, the detection roller 25 is a roller which detects the thickness of the sheet P of paper as a displacement amount.

A member 26 is a plate member having a rectangular shape and is provided vertically on a shaft 25a of the detection roller 25. A potentiometer 27 has the same configuration as that of the potentiometer 16 (refer to FIG. 7(a)) and is disposed below the board 22. The potentiometer 27 outputs a voltage according to the rotation amount of a rotary shaft 27a.

A rotating member 28 is a plate member having a substantially U-letter shape and is attached to the rotary shaft 27a. A linking member 29 indirectly links the detection roller 25 and the potentiometer 27 via the member 26 and the rotating member 28. One end 29a of the linking member 29 is coupled to a fulcrum member S, and the linking member 29 is provided rotatably in the direction B by using the fulcrum member S as a fulcrum. The other end 29b of the linking member 29 is in contact with a contact portion 28a of the rotating member 28, and a coupling portion 29c is coupled to a coupling portion 26a of the member 26.

To be specific, the displacement amount in the direction Z of the detection roller 25 is transmitted to the rotary shaft 27a of the potentiometer 27 via the member 26, the linking member 29, and the rotating member 28, and is detected as a rotation amount (voltage) of the rotary shaft 27a by the potentiometer 27.

In the configuration, when the sheet P of paper is carried in the direction X, the detection roller 25 is rotated in a state where it is in contact with the surface of the sheet P of paper, and is displaced in the direction Z in accordance with the thickness $t_1$ (or thickness $t_2$) of the sheet P of paper by using the supporting roller 23 as a rotary shaft. Interlockingly with the displacement of the detection roller 25, the rotary shaft 27a of the potentiometer 27 rotates in the direction A. The rotation amount of the rotary shaft 27a corresponds to the thickness $t_1$ (or thickness $t_2$) of the sheet P of paper. A voltage corresponding to the rotation amount of the rotary shaft 27a is output from the potentiometer 27 and converted into the thickness $t_1$ (or thickness $t_2$) of the sheet P of paper by a not-illustrated detection circuit.

Conventionally, other than the configuration using the potentiometer, there is also a thickness detecting apparatus 30 having the configuration shown in FIG. 8. FIG. 8 is a side view showing the configuration of the conventional thickness detecting apparatus 30. The thickness detecting apparatus 30 shown in FIG. 30 is disposed above the carrying path M. In the thickness detecting apparatus 30, a casing 31 houses the components.

A board 32 is disposed in parallel with the carrying path M so as to be fixedly supported by both faces of the casing 31. A coil 33 is attached to an attachment hole 32a in the board 32 so as to penetrate the attachment hole 32a. The lower part of the coil 33 is projected from the back side of the board 32 towards an opening 31a.

The thickness detecting circuit 34 is a circuit which electrically detects the thickness of the sheet P of paper and includes an oscillation circuit 35, a resistor 36, a capacitor 37, a detection circuit 38, and an amplifying circuit 39. The oscillation circuit 35 generates a high frequency signal. The oscillation circuit 35 is grounded via the resistor 36 and capacitor 37.

The detection circuit 38 is a circuit which detects a direct current signal according to the amplitude of the high frequency signal from the oscillation circuit 35. The direct current signal is a signal proportional to the distance (thickness of the sheet P of paper) between a detection roller 43 to be described herein later and the coil 33. The amplifying circuit 39 amplifies the direct current signal input from the detection circuit 38. An output signal of the amplifying circuit 39 corresponds to the thickness of the sheet P of paper as a result of the thickness detection. A cable 40 connects the coil 33 and the capacitor 37 in the thickness detection circuit 34.

The detection roller 43 is disposed below the coil 33 and near the opening 31a of the casing 31 and is rotatably supported by a supporting roller 41 via a shaft 43a and an arm 42. The detection roller 43 is a conductor. A part of the detection roller 43 is projected from the opening 31a toward the carrying path M side. The detection roller 43 is rotated in a state where it is in contact with the sheet P of paper and is displaced in the direction Z in accordance with the thickness of the sheet P of paper. That is, the detection roller 43 is a roller which detects the thickness of the sheet P of paper as a displacement amount.

In the configuration, when the oscillation circuit 35 is driven, a high frequency signal is supplied from the oscillation circuit 35 to the coil 33 via the resistor 36, capacitor 37, and the cable 40. Consequently, a high frequency current is passed to the coil 33 and a high-frequency field is generated around the coil 33.

When the sheet P of paper is carried in the direction X in such a state, the detection roller 43 is rotated in a state where it is in contact with the surface of the sheet P of paper and is displaced in the direction Z in accordance with the thickness $t_1$ (or thickness $t_2$) of the sheet P of paper by using the supporting roller 41 as a rotary shaft. When the detection roller 43 is displaced so as to approach the coil 33, an eddy current loss accompanying the high-frequency field from the coil 33 becomes large, so that the amplitude of the high frequency signal from the oscillation circuit 35 becomes small.

On the other hand, when the detection roller 43 is displaced so as to be apart from the coil 33, the eddy current loss accompanying the high-frequency field from the coil 33 becomes small, so that the amplitude of the high-frequency signal from the oscillation circuit 35 becomes large. In such a manner, the distance between the detection roller 43 and the coil 33 is proportional to the amplitude of the high-frequency signal from the oscillation circuit 35. That is, since the distance between the detection roller 43 and the coil 33 is proportional to the thickness of the sheet P of paper, the amplitude of the high frequency signal from the oscillation circuit 35 is proportional to the thickness of the sheet P of paper.

The high frequency signal from the oscillation circuit 35 is detected by the detection circuit 38. Therefore, the direct current signal according to the amplitude of the high frequency signal is output from the detection circuit 38 to the amplifying circuit 39. The direct current signal is amplified by the amplifying circuit 39. An output signal of the amplifying circuit 39 is a signal corresponding to the thickness of the sheet P of paper.

FIG. 9 is a side view showing the configuration of a conventional thickness detecting apparatus 50. The thickness detecting apparatus 50 shown in the diagram is another configuration as an example and is disposed above the carrying path M. In the thickness detecting apparatus 50, a casing 51 houses the components. A board 52 is attached to an attachment bases 51b and 51c of the casing 51. A bobbin 53 is attached to the back side of the board 52 so as to be projected toward the carrying path M from the back side of the board 52. A coil 54 is wound around the bobbin 53. The coil 54 is to generate a high-frequency field in a manner similar to the coil 33 shown in FIG. 8.

A thickness detecting circuit 55 is attached to the surface of the board 52, and is obtained by packaging the oscillation circuit 35, the resistor 36, the capacitor 37, the detection circuit 38, and the amplifying circuit 39 which are shown in FIG. 8. The thickness detecting circuit 55 is connected to the coil 54 via a not-illustrated cable in a manner similar to the thickness detecting circuit 34 (refer to FIG. 8).

A detection roller 58 is disposed below the bobbin 53 (coil 54) and near an opening 51a of the casing 51, and is rotatably supported by a supporting roller 56 via a shaft 58a and an arm 57. The detection roller 58 is a conductor. A part of the detection roller 58 is projected from the opening 51a toward the carrying path M side. The detection roller 58 is rotated in a state where it is in contact with the sheet P of paper and is displaced in the direction Z in accordance with the thickness of the sheet P of paper. That is, the detection roller 58 is a roller which detects the thickness of the sheet P of paper as a displacement amount.

In the configuration, when the oscillation circuit 35 (refer to FIG. 8) of the thickness detecting circuit 55 is driven, a high frequency signal is supplied from the oscillation circuit 35 to the coil 54 via the resistor 36, the capacitor 37, and the cable (not shown). Consequently, a high frequency current is passed to the coil 54 and a high-frequency field is generated around the coil 54.

When the sheet P of paper is carried in the direction X in such a state, the detection roller 58 is rotated in a state where it is in contact with the surface of the sheet P of paper and is displaced in the direction Z in accordance with the thickness $t_1$ (or thickness $t_2$) of the sheet P of paper by using the supporting roller 56 as a rotary shaft. As described with reference to FIG. 8, the amplitude of the high frequency signal from the oscillation circuit 35 changes according to the distance between the coil 54 and the detection roller 58, that is, the thickness of the sheet P of paper.

The high frequency signal from the oscillation circuit 35 is detected by the detection circuit 38 (refer to FIG. 8) of the thickness detecting circuit 55. Therefore, the direct current signal according to the amplitude of the high frequency signal is output from the detection circuit 38 to the amplifying circuit 39. The direct current signal is amplified by the amplifying circuit 39. An output signal of the amplifying circuit 39 is a signal corresponding to the thickness of the sheet P of paper.

As described above, in the conventional thickness detecting apparatus 10 (refer to FIG. 7(a)) and the thickness detecting apparatus 20 (refer to FIG. 7(b)), the potentiometers 16 and 27 including the mechanical structure part are used as sensors. It causes a problem of high cost and a large size of the apparatus by the amount corresponding the space in which the potentiometer 16 or 27 is disposed.

Since the conventional thickness detecting apparatus 30 (refer to FIG. 8) has a configuration such that the coil 33 and the thickness detecting circuit 34 are separately provided and connected via the cable 40, noise easily occurs in the cable 40 and, further, it is very difficult to keep the distributed constant in the cable 40 at a constant value.

Therefore, in the conventional thickness detecting apparatus 30, since the stability of the distributed constant exerts a direct influence on the accuracy of detection of the thickness of the sheet P of paper, a problem of low detection accuracy exists.

Further, in the conventional thickness detecting apparatus 50 (refer to FIG. 9), at the time of winding the coil 54 around the bobbin 53, uneven winding occurs. Consequently, it is very difficult to maintain the inductance of the coil to a constant value. In a manner similar to the case of the thickness detecting apparatus 30 (refer to FIG. 8), the distributed constant becomes unstable. The conventional thickness detecting apparatus 50 therefore has a problem such that the detection accuracy is low.

In addition, in the conventional thickness detecting apparatuses 30 and 50, due to the thickness of the coil 33 (refer to FIG. 8) and the bobbin 53 (coil 54) (refer to FIG. 9), there is a problem such that the size of the apparatus is naturally large.

It is an object of this invention to provide a low-cost, small-sized thickness, and accurate detecting apparatus.

DISCLOSURE OF THE INVENTION

The thickness detecting apparatus according to one aspect of the present invention comprises a board (corresponding to a printed board 120 in a first embodiment to be described hereinlater) in a part of which a coil (corresponding to a coil 130 in the first embodiment) is patterned, detecting unit (corresponding to a detection roller 170 in the first embodiment) disposed near the coil, which detects thickness of an object to be detected as a displacement amount, and a detection circuit (corresponding to a thickness detection circuit 140 in the first embodiment) mounted on the board, which supplies a signal to the coil via a wiring pattern (corresponding to a wiring pattern 180 in the first embodiment) formed in the board and detects the signal which changes according to the displacement amount of the detecting unit as a thickness of the object to be detected.

According to the above-mentioned aspect, when the detecting unit is displaced according to the thickness of the object to be detected, a signal changes via the coil in accordance with the displacement amount of the detecting unit. Consequently, the detection circuit detects the signal as the thickness of the object to be detected.

Thus, the coil is patterned in the area as a part of the board, so that the smaller apparatus and lower cost as compared with the conventional case which uses a potentiometer or the case which attaches the coil to the board can be achieved.

Furthermore, the coil and the wiring pattern are patterned in the board. Thus, the influence of noise and fluctuation in the distributed constant can be reduced more than the conventional case which uses a cable, and the detection accuracy can be therefore increased.

The thickness detecting apparatus according to another aspect of the present invention comprises a board (corresponding to the printed board 120 in a second embodiment to be described hereinlater) in a part of which a coil (corresponding to the coil 130 in the second embodiment) is patterned, detecting unit (corresponding to the detection roller 170 in the second embodiment) disposed near the board, which detects thickness of an object to be detected as a displacement amount, moving unit (corresponding to the moving member 220 in the second embodiment) disposed near the coil, linking unit (corresponding to a linking member 230 and a fulcrum member 240 in the second embodiment) which links the detecting unit and the moving unit and displaces the moving unit in the direction opposite to the direction in which the detecting unit is displaced, and a detection circuit (corresponding to the thickness detection circuit 140 in the second embodiment) mounted on the substrate, which supplies a signal to the coil via a wiring pattern formed in the board and detects the signal which changes according to the displacement amount of the detecting unit as a thickness of the object to be detected.

According to the above-mentioned aspect, when the detecting unit is displaced toward, for example, the coil side in accordance with the thickness of the object to be detected, the moving unit is displaced in the direction (the side of the object to be detected) opposite to the displacement direction of the detecting unit by the linking unit. That is, in this case, the moving unit is displaced so as to be apart from the coil. In association with the displacement of the moving unit, a signal changes via the coil. Thus, the detection circuit detects the signal as the thickness of the object to be detected.

Thus, the linking unit is provided to move the moving unit so as to be apart from the coil. Thus, collision of the moving unit with the coil can be prevented.

The thickness detecting apparatus further comprises a spacer (corresponding to a spacer 310 in a third embodiment to be described hereinlater) disposed between the moving unit and the coil, which keeps a distance between the moving unit in an initial position and the coil to be constant.

Since the spacer is provided, the initial position of the moving unit can be kept in a fixed position. Thus, the initial position can be managed easily.

The thickness detecting apparatus further comprises an energizing unit (corresponding to springs 450 and 460 in a fourth embodiment to be described hereinafter) which provides the moving unit with force toward the coil side.

Since the moving unit is energized toward the coil side by the energizing unit, the initial position of the moving unit can be always kept in the fixed position. Thus, the initial position can be managed more easily.

The thickness detecting apparatus further comprises a displacement amount amplifying unit (corresponding to the fulcrum member 240 in the second to fourth embodiments to be displaced hereinlater) which amplifies a displacement amount of the moving unit at a predetermined ratio with respect to the displacement amount of the detecting unit in the linking unit.

The displacement amount of the moving unit is amplified at a predetermined ratio defined by ratio of length between the fulcrum member 240 and one end 230a to length between the fulcrum member 240 and the other end 230b with respect to the displacement amount of the detecting unit by the displacement amount amplifying unit. Thus, the detection sensitivity can be improved.

BRIEF DESCRIPTION OF THE DRAWINGS

FIG. 2 is a plan view showing the configuration of a coil 130 illustrated in FIG. 1;

BEST MODE FOR CARRYING OUT THE INVENTION

The present invention will be described in more detail with reference to the attached drawings.

Figure 1:
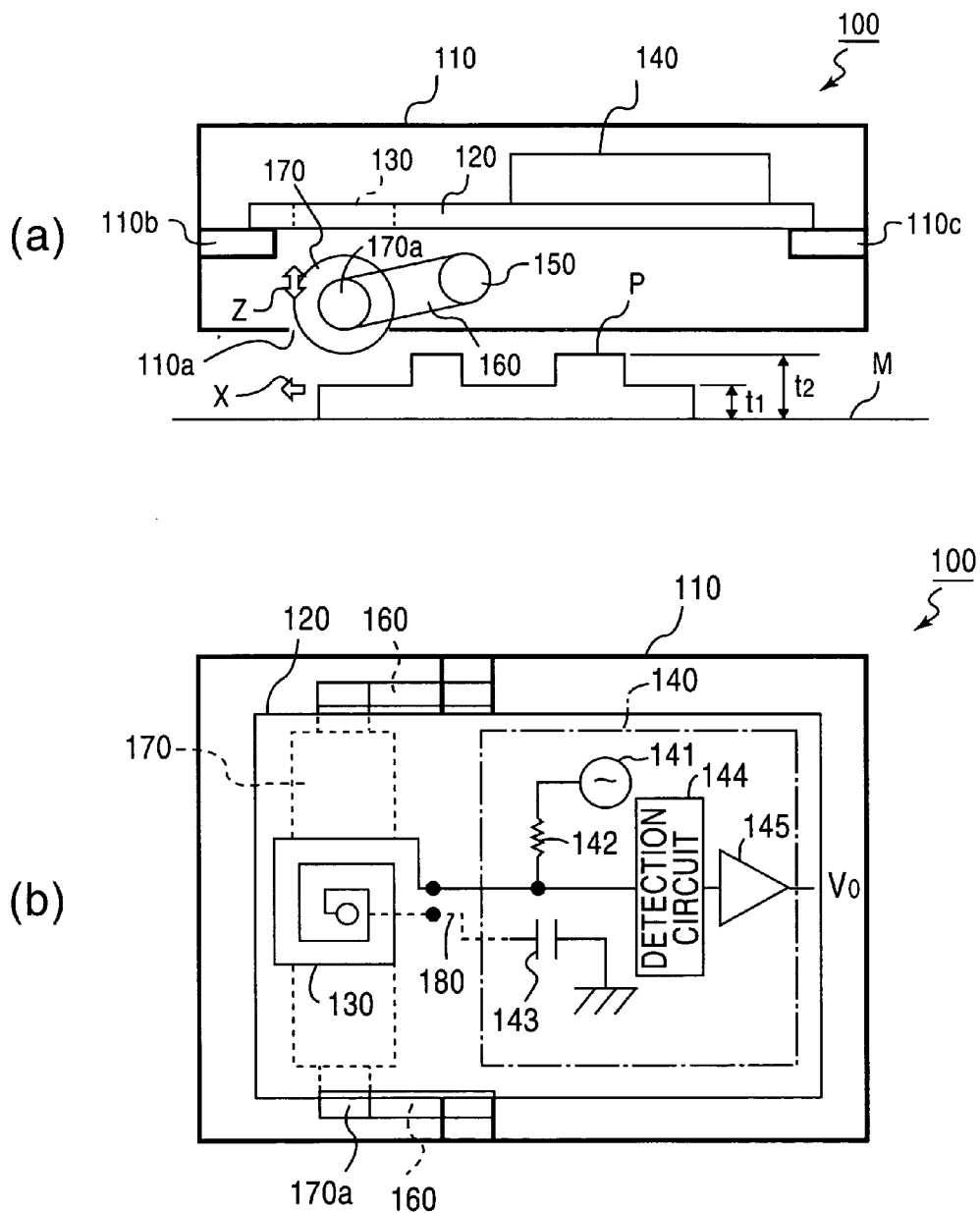
FIG. 1 is a diagram showing the configuration of a first embodiment according to the invention.

FIGS. 1(a) and 1(b) are diagrams each showing the configuration of a first embodiment according to the invention. FIG. 1(a) is a side view showing the configuration of a thickness detecting apparatus 100, and FIG. 1(b) is a plan view showing the configuration of the thickness detecting apparatus 100 illustrated in FIG. 1(a). The thickness detecting apparatus 100 shown in FIG. 1(a) is disposed above a carrying path M. In the thickness detecting apparatus 100, a casing 110 houses the components. A printed board 120 is disposed so as to be fixedly supported by attachment bases 110b and 110c positioned on both-side faces of the casing 110 and in parallel with the carrying path M.

A coil 130 is patterned (embedded) in the printed board 120 by using a patterning technique in semiconductor fabrication. Specifically, the coil 130 is patterned in the printed board 120 so as to have a four-layer structure of a first layer coil $130_1$, a second layer coil $130_2$, a third layer coil $130_3$, and a fourth layer coil $130_4$ shown in FIGS. 2(a) to 2(d), respectively.

Terminals a, b, and c shown in FIG. 2(a) are formed in the printed board 120 (refer to FIG. 1(a)) so as to penetrate the printed board 120 through the back side and the surface side. The first layer coil $130_1$ shown in FIG. 2(a) is patterned in a spiral shape in the first layer on the back side of the printed board 120. One end of the first layer coil $130_1$ is connected to the terminal b and the other end is connected to one of the wiring patterns 180 (refer to FIG. 1(b)) to be described hereinlater.

The second layer coil $130_2$ shown in FIG. 2(b) is patterned in a spiral shape in the second layer on the first layer coil $130_1$. One end of the second layer coil $130_2$ is connected to one end of the first layer coil $130_1$ via the terminal b, and the other end is connected to the terminal a.

The third layer coil $130_3$ shown in FIG. 2(c) is patterned in a spiral shape in the third layer on the second layer coil $130_2$. One end of the third layer coil $130_3$ is connected to the terminal c and the other end is connected to the other end of the second layer coil $130_2$ via the terminal a.

The fourth layer coil $130_4$ shown in FIG. 2(d) is patterned in a spiral shape in the fourth layer on the third layer coil $130_3$. One end of the fourth layer coil $130_4$ is connected to one end of the third layer coil $130_3$ via the terminal c, and the other end is connected to the other wiring pattern of the wiring pattern 180 shown in FIG. 1(b).

As described above, in the first embodiment, the coil 130 (refer to FIGS. 1(a) and 1(b)) is formed ultra-precisely by using the patterning technique in semiconductor fabrication, so that the inductance of the coil 130 can be kept at a constant value.

Figure 3:
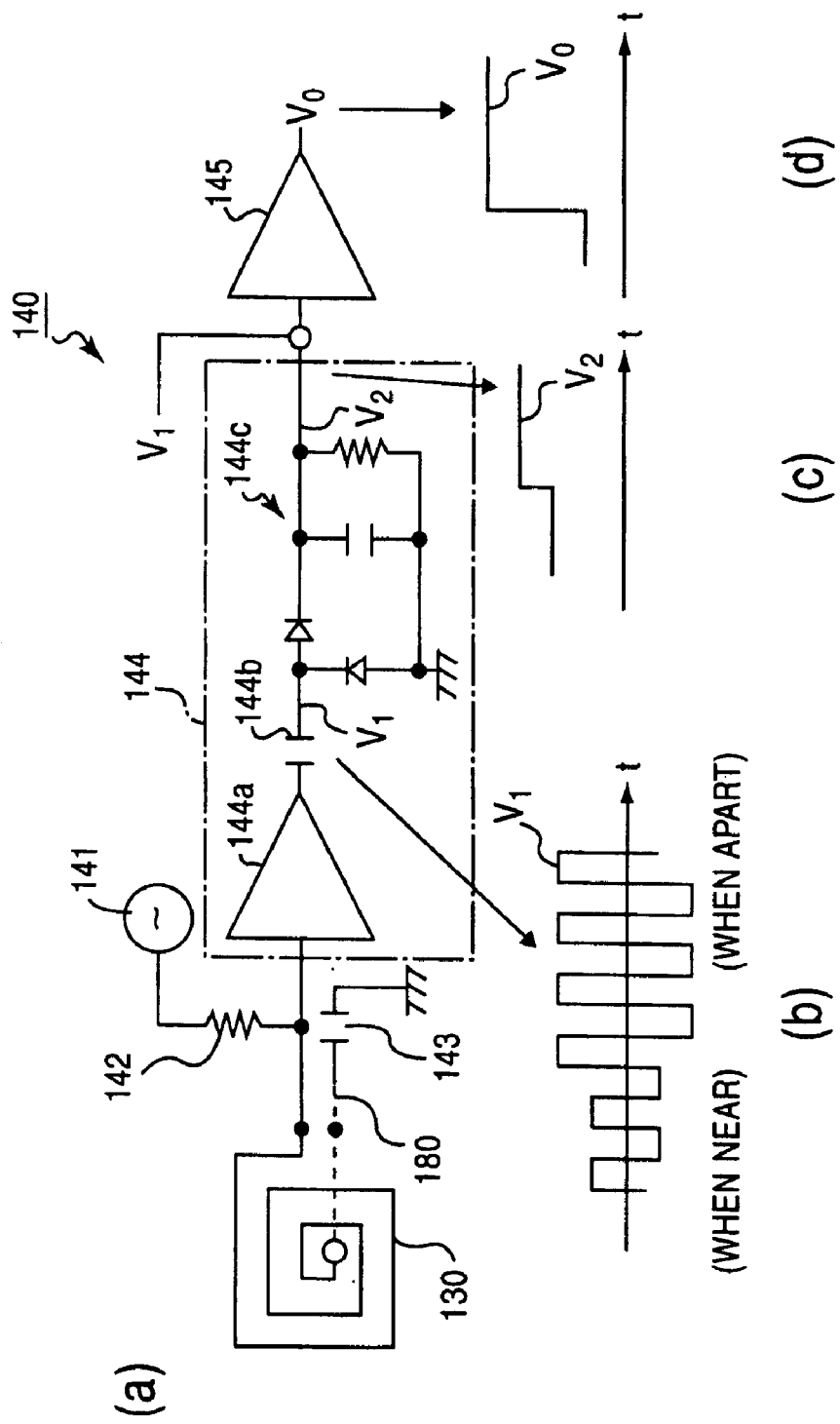
FIG. 3 is a diagram showing the configuration of the coil 130 and a thickness detecting circuit 140 illustrated in FIG. 1.

A thickness detecting circuit 140 shown in FIG. 1(b) is a circuit which electrically detects the thickness of the sheet P of paper and is mounted on the surface of the printed board 120. The thickness detecting circuit 140 has an oscillator 141, a resistor 142, a capacitor 143, a detection circuit 144, and an amplifying circuit 145. The oscillator 141 outputs a high frequency signal via the resistor 142. The detection circuit 144 has, as shown in FIG. 3(a), a buffer amplifier circuit 144a, a capacitor 144b, and a detector 144c constructed by a diode, a capacitor, and a resistor and is a circuit which detects a direct current signal $V_2$ according to the amplitude of a high frequency signal $V_1$ from the oscillator 141. The direct current signal $V_2$ is a signal proportional to the distance between a detection roller 170 to be described hereinlater and the coil 130 (thickness of the sheet P of paper).

The amplifying circuit 145 amplifies the direct current signal $V_2$ input from the detection circuit 144. An output signal $V_o$ of the amplifying circuit 145 corresponds to the thickness of the sheet P of paper as a result of the thickness detection. An offset cancel voltage $V_f$ which cancels an offset voltage is supplied to the amplifying circuit 145. The wiring pattern 180 is patterned on the surface of the printed board 120 (refer to FIG. 1(b)), connects one end of the coil 130 and one end of the resistor 142, and connects the other end of the coil 130 and one end of the capacitor 143. The other end of the capacitor 143 is grounded.

The detection roller 170 shown in FIG. 1(a) is disposed below the coil 130 and near an opening 110a, of the casing 110 and is rotatably supported by a supporting roller 150 via a shaft 170a and an arm 160. The detection roller 170 is a conductor. A part of the detection roller 170 is projected from the opening 110a toward the carrying path M side. The detection roller 170 is rotated in a state where it is in contact with the sheet P of paper and is displaced in the direction Z in accordance with the thickness of the sheet P of paper. That is, the detection roller 170 is a roller which detects the thickness of the sheet P of paper as a displacement amount.

In the above configuration, when the oscillator 141 shown in FIG. 3(a) is driven, a high frequency signal is supplied from the oscillator 141 to the coil 130 via the resistor 142 and the wiring pattern 180. Consequently, a high frequency current is passed to the coil 130 shown in FIG. 1(a) and a high-frequency field is generated around the coil 130.

When the sheet P of paper is carried in the direction X in such a state, the detection roller 170 is rotated in a state where it is in contact with the surface of the sheet P of paper and is displaced in the direction Z in accordance with the thickness $t_1$ (or thickness $t_2$) of the sheet P of paper by using the supporting roller 150 as a rotary shaft. When the detection roller 170 is displaced so as to approach the coil 130, an eddy current loss accompanying the high-frequency field from the coil 130 becomes large, so that the amplitude of the high frequency signal $V_1$ from the oscillator 141 becomes small as shown in FIG. 3(b).

On the contrary, when the detection roller 170 is displaced so as to be a part from the coil 130, the eddy current loss accompanying the high-frequency field from the coil 130 becomes small, so that the amplitude of the high-frequency signal $V_1$ from the oscillator 141 becomes large as shown in FIG. 3(b). In such a manner, the distance between the detection roller 170 and the coil 130 is proportional to the amplitude of the high frequency signal $V_1$ from the oscillator 141. That is, since the distance between the detection roller 170 and the coil 130 is proportional to the thickness of the sheet P of paper, the amplitude of the high frequency signal $V_1$ from the oscillator 141 is proportional to the thickness of the sheet P of paper.

The high frequency signal $V_1$ (refer to FIG. 3(b)) from the oscillator 141 shown in FIG. 6B is detected by the detection circuit 144. That is, the direct current signal $V_2$ (refer to FIG. 3(c)) according to the amplitude of the high frequency signal $V_1$ is output from the detection circuit 144 to the amplifying circuit 145. The direct current signal $V_2$ is amplified by the amplifying circuit 145. The output signal $V_o$ (refer to FIG. 3(d)) of the amplifying circuit 145 is a signal corresponding to the thickness of the sheet P of paper.

As described above, according to the first embodiment, the coil 130 having the multilayer structure is patterned in the printed board 120 as shown in FIG. 1(a), as compared with the case of using a potentiometer or the case of attaching the coil to the substrate as in the conventional techniques, a smaller apparatus and a lower cost can be achieved. The coil 130 is patterned by using a redundant space of the printed board 120. Therefore, in the first embodiment, it is unnecessary to prepare a printed board dedicated to the coil 130.

According to the first embodiment, since the coil 130 and the wiring pattern 180 are patterned by using the patterning technique in semiconductor fabrication, as compared with the conventional case of using a cable, the influence of noise and fluctuation in the distributed constant can be reduced. Thus, detection precision can be increased.

Figure 4:
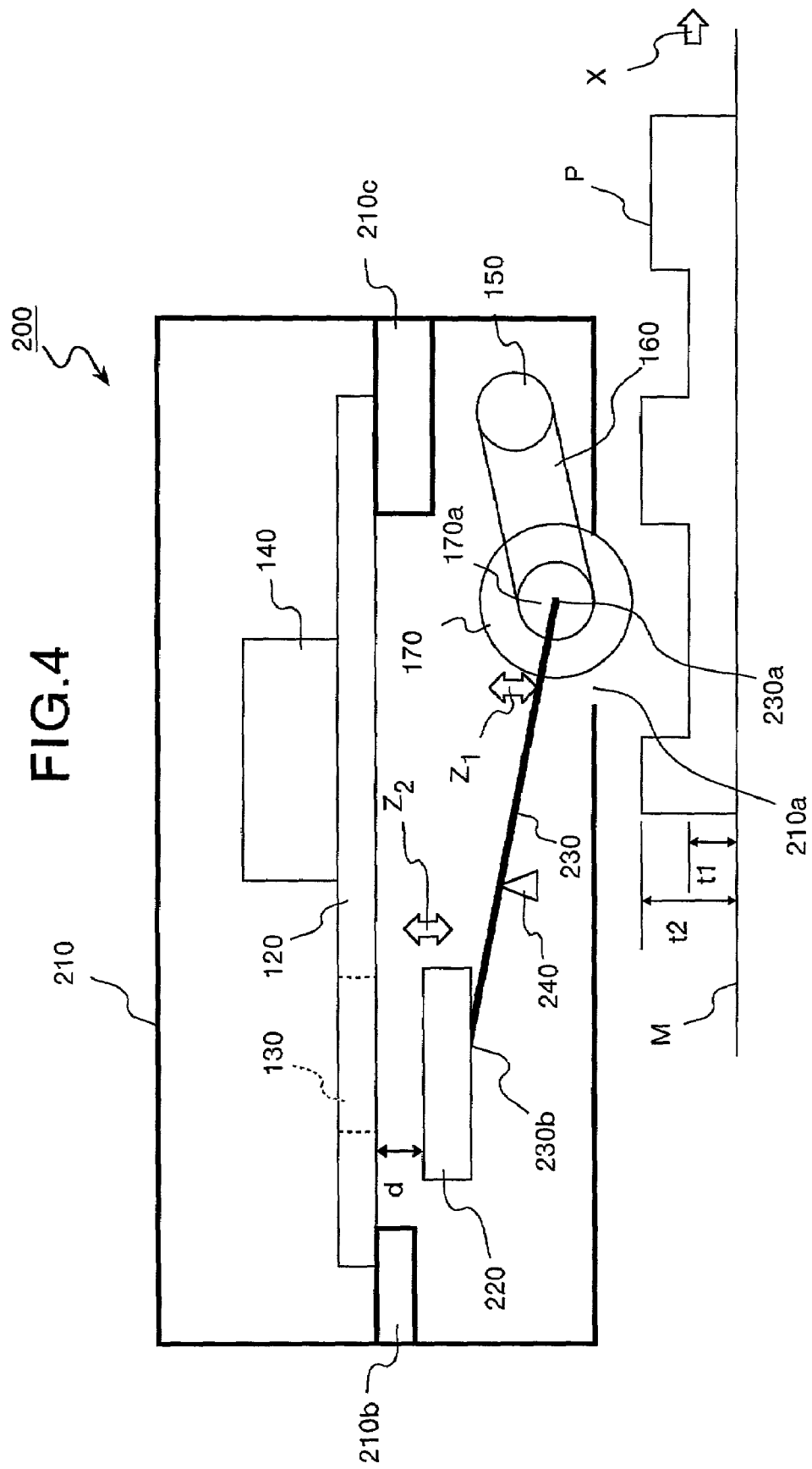
FIG. 4 is a side view showing the configuration of a second embodiment according to the invention.

FIG. 4 is a side view showing the configuration of a second embodiment of the invention. In the drawing, the parts corresponding to those in FIG. 1(a) are designated by the same reference numerals and their description will not be repeated. In a thickness detecting apparatus 200 shown in FIG. 4, in place of the casing 110 shown in FIG. 1(a), a casing 210 is provided, and a moving member 220, a linking member 230, and a fulcrum member 240 are newly provided. In FIG. 4, the supporting roller 150, the arm 160, and the detection roller 170 are disposed near an opening 210a of the casing 210.

The moving member 220 is a plate-shaped conductor disposed below the coil 130. The linking member 230 links the detection roller 170 and the moving member 220. Specifically, one end 230a of the linking member 230 is coupled to the shaft 170a of the detection roller 170 and the other end 230b of the linking member 230 is coupled to the moving member 220. Further, the linking member 230 is supported by the fulcrum member 240. Specifically, when the detection roller 170 is displaced in the direction $Z_1$ (for example, upward), the moving member 220 is displaced in the direction $Z_2$ (downward) opposite to the direction $Z_1$.

In the above configuration, when the oscillator 141 shown in FIG. 3(a) is driven, a high frequency signal is supplied from the oscillator 141 to the coil 130 via the resistor 142 and the wiring pattern 180. Consequently, a high frequency current is passed to the coil 130 shown in FIG. 4 and a high-frequency field is generated around the coil 130.

When the sheet P of paper is carried in the direction X in such a state, the detection roller 170 is rotated in a state where it is in contact with the surface of the sheet P of paper and is displaced in the direction $Z_1$ (for example, upward) in accordance with the thickness $t_1$ (or thickness $t_2$) of the sheet P of paper by using the supporting roller 150 as a rotary shaft. Inter lockingly, the moving member 220 is displaced in the direction $Z_2$ (downward) opposite to the direction $Z_1$. Specifically, in this case, since the moving member 220 is displaced so as to be apart from the coil 130, the distance d between the coil 130 and the moving member 220 becomes longer.

At this time, the moving member 220 is displaced so as to be apart from the coil 130, an eddy current loss accompanying the high-frequency field from the coil 130 is reduced, and the amplitude of the high frequency signal $V_1$ from the oscillator 141 becomes large as shown in FIG. 3(b). That is, the thickness of the sheet P of paper is inversely proportional to the amplitude of the high frequency signal $V_1$ from the oscillator 141.

On the other hand, when the detection roller 170 is displaced in the direction $Z_1$ (for example, downward), interlockingly, the moving member 220 is displaced in the direction $Z_2$ (upward) opposite to the direction $Z_1$. Specifically, in this case, since the moving member 220 is displaced so as to approach the coil 130, the distance d between the coil 130 and the moving member 220 is reduced.

At this time, the moving member 220 is displaced so as to approach the coil 130, an eddy current loss accompanying the high-frequency field from the coil 130 increases and, as shown in FIG. 3(b), the amplitude of the high frequency signal $V_1$ from the oscillator 141 becomes smaller.

The high frequency signal $V_1$ (refer to FIG. 3(b)) from the oscillator 141 is detected by the detection circuit 144. Specifically, the direct current signal $V_2$ (refer to FIG. 3(c)) according to the amplitude of the high frequency signal $V_1$ is output from the detection circuit 144 to the amplifying circuit 145. The direct current signal $V_2$ is therefore amplified by the amplifying circuit 145. An output signal $V_o$ of the amplifying circuit 145 is a signal which is inversely proportional to the thickness of the sheet P of paper.

As described above, according to the second embodiment, the moving member 220, the linking member 230, and the fulcrum member 240 are provided. When the thickness of the sheet P of paper increases, the moving member 220 is moved so as to be apart from the coil 130. Thus, collision of a matter (in this case, moving member 220) with the coil 130 can be prevented.

Figure 5:
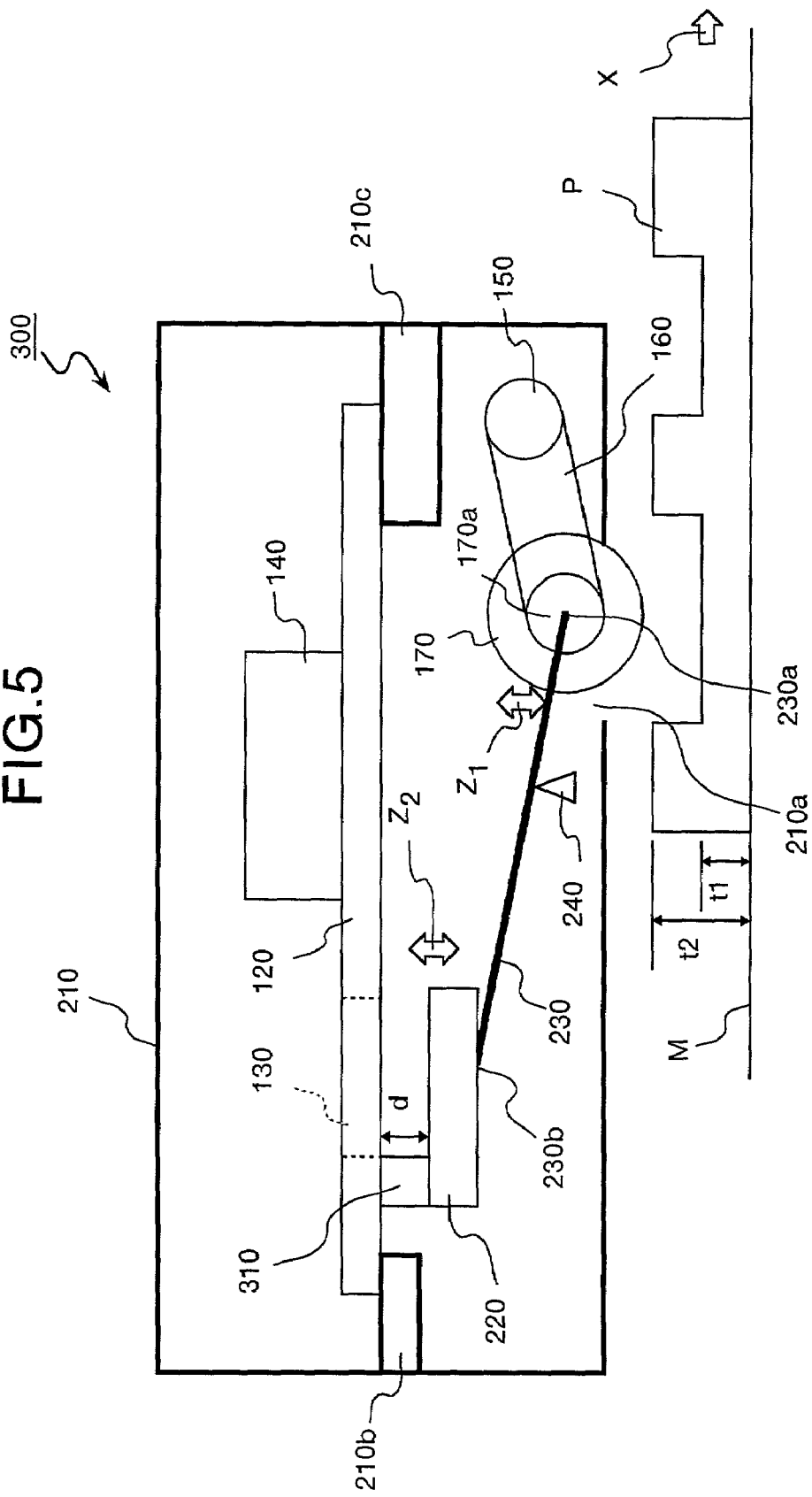
FIG. 5 is a side view showing the configuration of a third embodiment according to the invention.

FIG. 5 is a side view showing the configuration of a third embodiment according to the invention. In FIG. 5, the parts corresponding to those in FIG. 4 are designated by the same reference numerals. In a thickness detecting apparatus 300 shown in FIG. 5, a spacer 310 is newly provided. The spacer 310 is attached to the back side of the printed board 120 near the coil 130 so that the distance between the moving member 220 in an initial position and the coil 130 is regulated to the distance d. That is, the spacer 310 is used to keep the initial position of the moving member 220 in the fixed position. The operation which detects the thickness of the sheet P of paper in the third embodiment is similar to that of the foregoing second embodiment.

As described above, according to the third embodiment, the spacer 310 is provided, so that the initial position of the moving member 220 is kept in the fixed position. Consequently, the initial position can be easily managed and the output signal $V_o$ corresponding to the initial position can be made stable.

Figure 6:
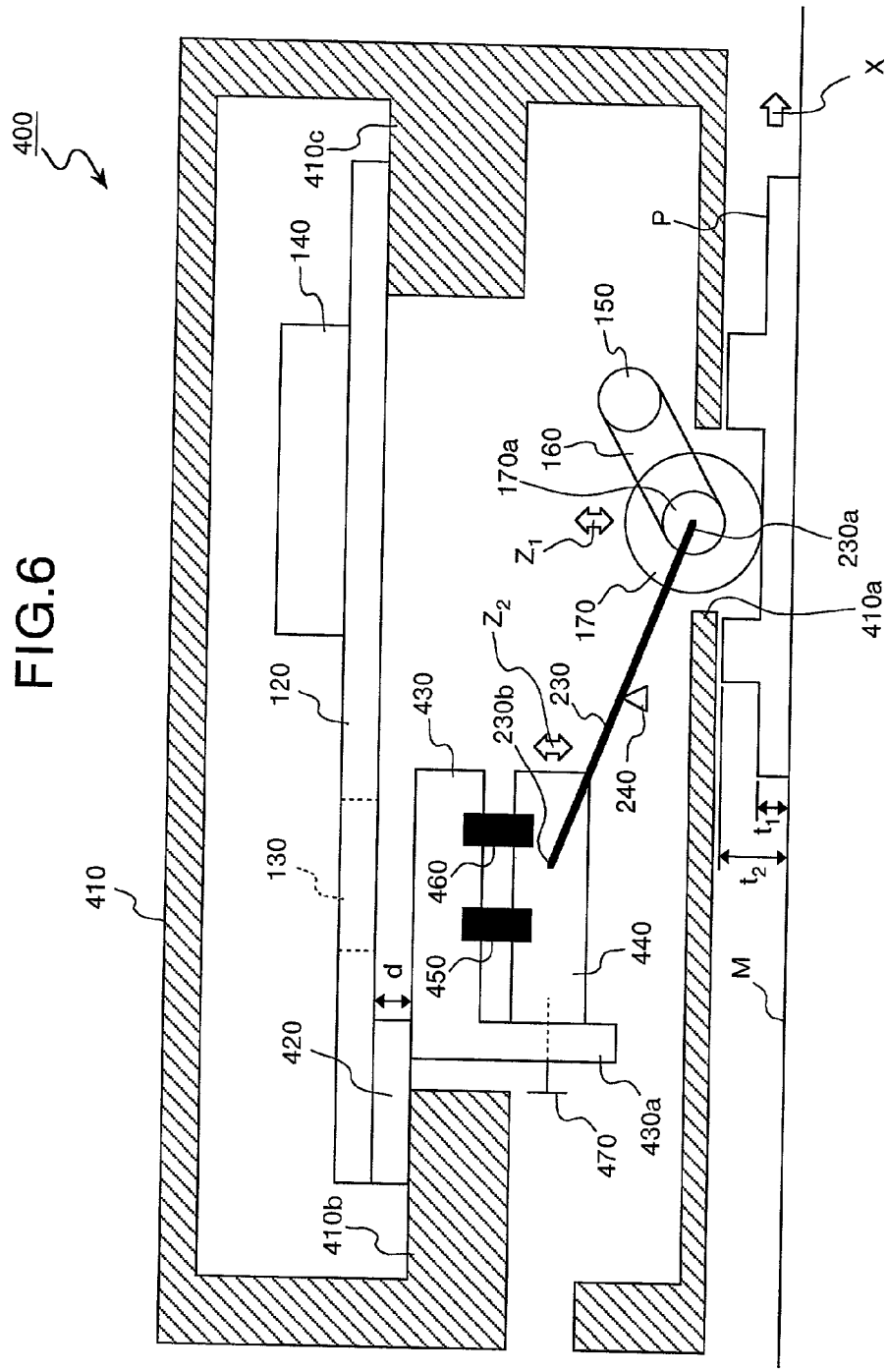
FIG. 6 is a side view showing the configuration of a fourth embodiment according to the invention.
Figure 7:
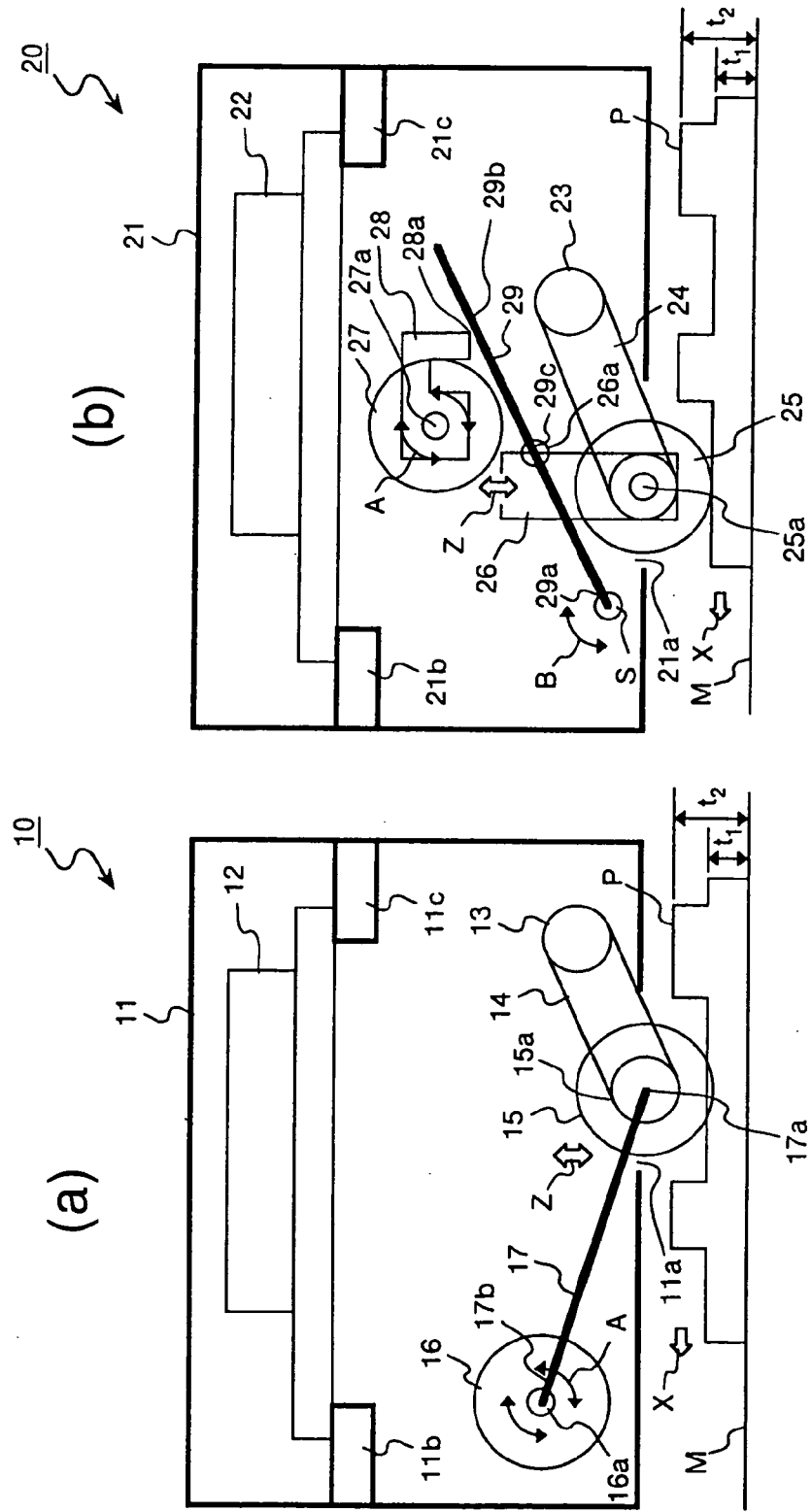
FIG. 7 is a side view showing the configuration of conventional thickness detecting apparatuses 10 and 20.
Figure 8:
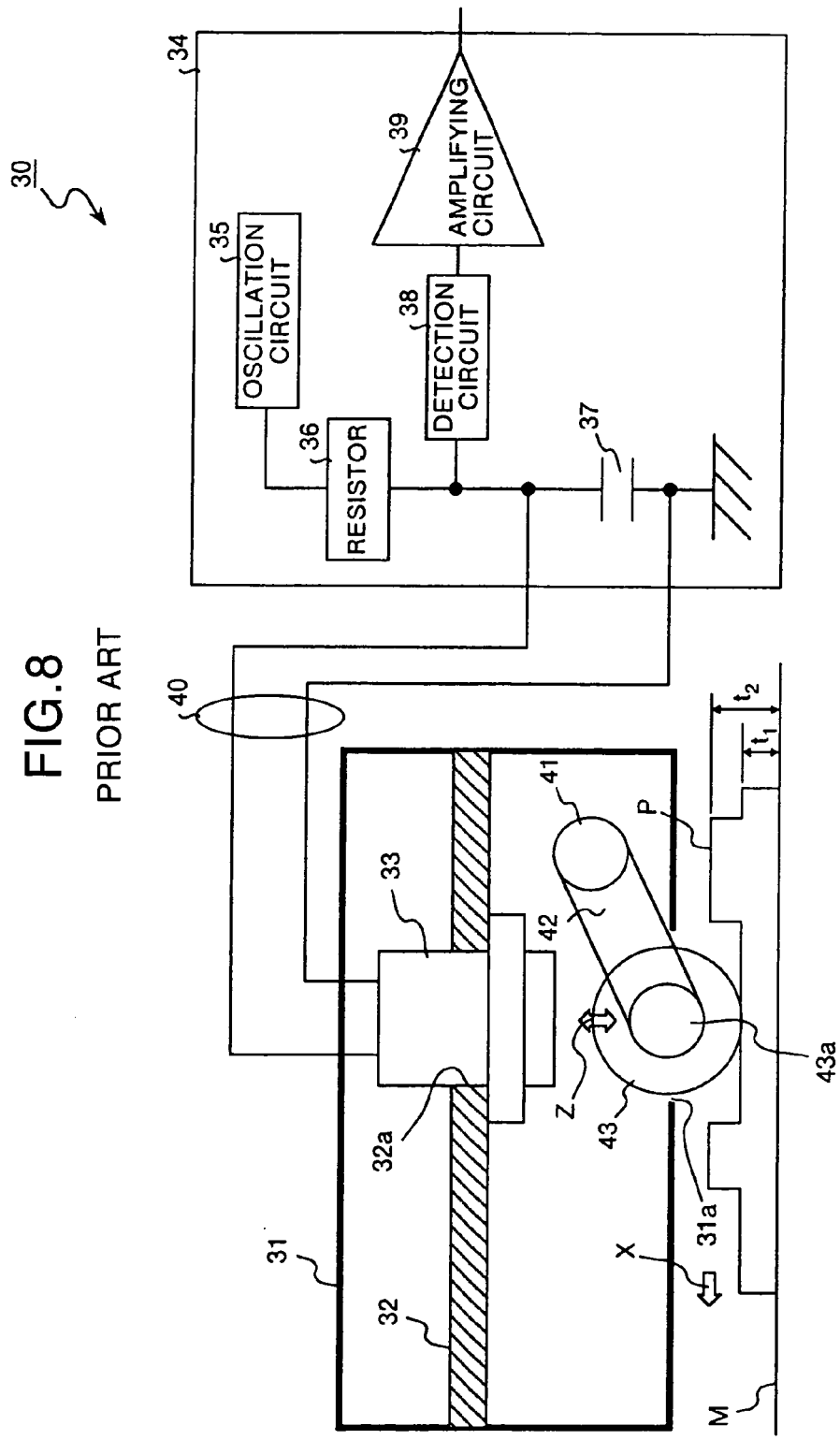
FIG. 8 is a diagram showing the configuration of a conventional thickness detecting apparatus 30.
Figure 9:
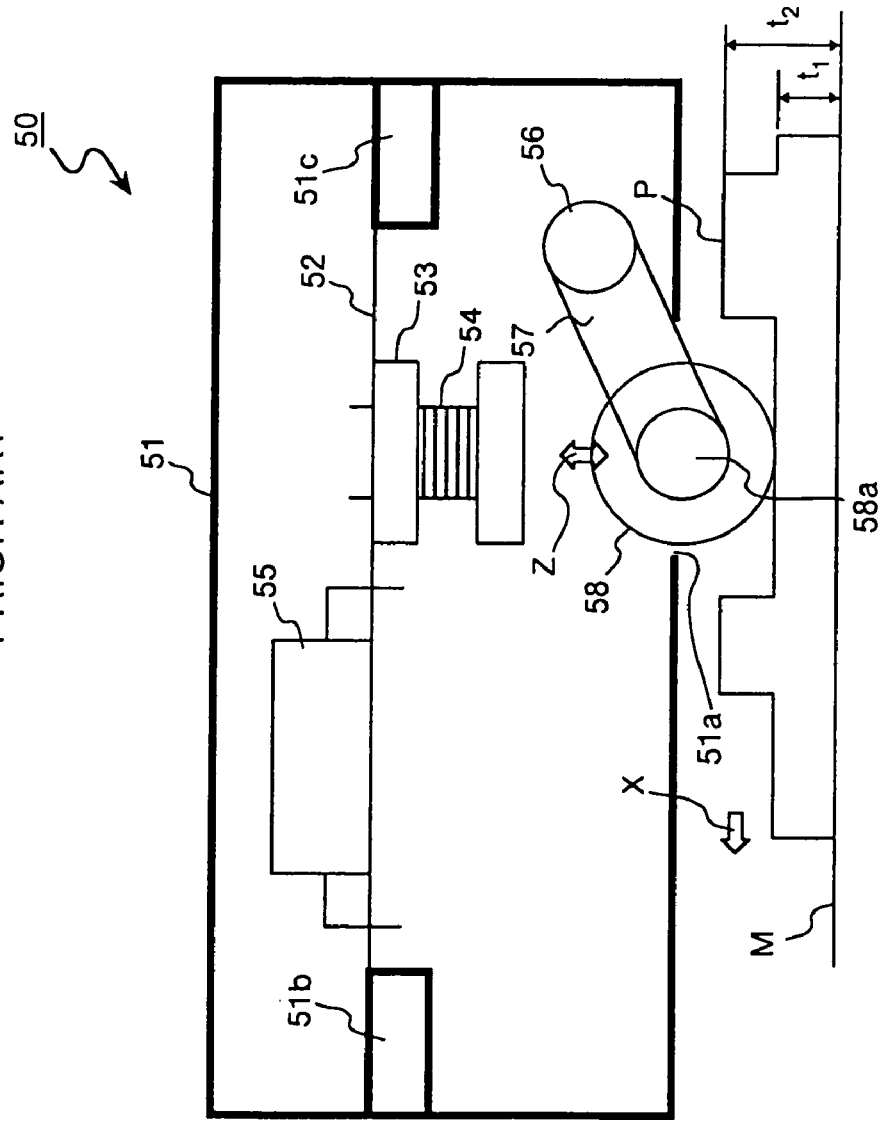
FIG. 9 is a side view showing the configuration of a conventional thickness detecting apparatus 50.

FIG. 6 is a sectional side view showing the configuration of a fourth embodiment according to the invention. In the drawing, the parts corresponding to those in FIG. 5 are designated by the same reference numerals. In a thickness detecting apparatus 400 shown in FIG. 6, in place of the casing 210, the spacer 310, and the moving member 220 shown in FIG. 5, a casing 410, a spacer 420, a first moving member 430, a second moving member 440, springs 450 and 460, and a fixing screw 470 are provided.

In FIG. 6, the supporting roller 150, the arm 160, and the detection roller 170 are disposed near an opening 410a of the casing 410. The printed board 120 is attached to an attachment bases 410b and 410c positioned on both side faces of the casing 410. The left end portion in the drawing of the printed board 120 is attached to the attachment base 410b via the spacer 420.

The spacer 420 is interposed near the coil 130 and between the printed board 120 and the attachment base 410b and, in a manner similar to the spacer 310 (refer to FIG. 5), regulates the distance between the first moving member 430 in the initial position and the coil 130 to d. That is, the spacer 420 is used to always keep the initial position of the first moving member 430 in a fixed position.

The first moving member 430 is a conductor formed in a substantially L shape in section and, like the moving member 220 (refer to FIG. 5), is disposed so as to be movable in the direction $Z_2$. The second moving member 440 is disposed in parallel with the horizontal portion of the first moving member 430 and coupled to the other end 230b of the linking member 230. The springs 450 and 460 are interposed between the horizontal portion of the first moving member 430 and the second moving member 440 and provide the first moving member 430 with force toward the spacer 420 and coil 130. The fixing screw 470 supports and fixes the second moving member 440 to a support portion 430a of the first moving member 430.

In the above configuration, the first moving member 430 is energized toward the spacer 420 by the springs 450 and 460, so that it is pressed against the spacer 420. The operation which detects thickness of the sheet P of paper in the fourth embodiment is similar to that of the foregoing second embodiment.

As described above, according to the fourth embodiment, the initial position of the first moving member 430 is always kept in the fixed position by the springs 450 and 460, so that the initial position can be managed more easily, and the output signal $V_o$ corresponding to the initial position can be further stabilized.

In the foregoing second to fourth embodiments, the fulcrum member 240 (refer to FIGS. 4 to 6) may be disposed in a position close to the one end 230a side. In this case, by the principle of a lever, the displacement amount of the moving member 220 (first and second moving members 430 and 440) is amplified at a predetermined ratio defined by ratio of length between the fulcrum member 240 and one end 230a to length between the fulcrum member 240 and the other end 230b with respect to the displacement amount of the detection roller 170, so that detection sensitivity can be improved.

As described above, according to the invention, since the coil is patterned in a part of the board, there is an effect such that the smaller size of the apparatus and lower cost as compared with the case of using a potentiometer or the case of attaching the coil to the substrate as in the conventional techniques can be achieved.

Since the coil and the wiring pattern are patterned in the board, there is an effect such that the influence of noise and fluctuation in the distributed constant can be reduced more than the conventional case of using a cable and, therefore, detection precision can be increased.

The linking unit is provided to make the moving unit apart from the coil, resulting in an effect such that collision of the moving unit with the coil can be prevented.

Since the spacer is provided to keep the initial position of the moving unit in the fixed position, an effect such that the initial position can be easily managed can be achieved.

Since the moving unit is energized toward the coil side by the energizing unit, the initial position of the moving unit is kept in the fixed position. Thus, an effect such that the initial position can be managed more easily can be achieved.

Since the displacement amount of the moving unit is amplified at a predetermined ratio with respect to the displacement amount of the detecting unit by the displacement amount amplifying unit, an effect such that detection sensitivity can be improved can be achieved.

INDUSTRIAL APPLICABILITY

As described above, a thickness detecting apparatus according to the invention is useful for an ATM or the like requiring the function of detecting the thickness of a bank note.

The invention claimed is:

1. A thickness detecting apparatus comprising:
  a printed-circuit board including a pattern of a coil and a detection circuit which detects a signal representing thickness of an object detected;
  a detecting unit comprising a roller which detects thickness of the object by displacement of the roller;
  a thickness-representing unit disposed near the coil whose displacement amount represents the thickness of the object detected by the detecting unit, the thickness-representing unit including:
    a moving unit disposed near the coil; and
    a linking unit which links the detecting unit and said moving unit and displaces the moving unit in a direction opposite to a direction in which the detecting unit is displaced; and
  a spacer attached to the backside of the printed-circuit board and disposed between the moving unit and the coil, which causes an initial position of the moving unit to remain fixed relative to the coil, wherein the detection circuit supplies a high-frequency signal to the coil via a wiring connected to the coil and detects the thickness of the object based on the signal representing the thickness of the object which varies according to the displacement amount of the thickness-representing unit, the coil is disposed adjacent to the detection circuit on the printed-circuit board, and the coil is disposed at a position where the thickness-representing unit approaches.

2. The thickness detecting apparatus according to claim 1, further comprising an energizing unit which provides the moving unit with force toward the coil.

* * * * *

UNITED STATES PATENT AND TRADEMARK OFFICE
CERTIFICATE OF CORRECTION

PATENT NO. : 7,323,867 B2 Page 1 of 1
APPLICATION NO. : 10/108897
DATED : January 29, 2008
INVENTOR(S) : Tadashi Ueoka It is certified that error appears in the above-identified patent and that said Letters Patent is hereby corrected as shown below:

On the Title page and Col. 1:

Item "(54)" "APPARATUS WHICH DETECTS THE THICKNESS OF A SHEET OF PAPER SUCH AS A BANK NOTE"

should read:

Item "(54)" --AN APPARATUS WHICH DETECTS THE THICKNESS OF A SHEET OF PAPER SUCH AS A BANK NOTE--

Signed and Sealed this

Twentieth Day of May, 2008

JON W. DUDAS
*Director of the United States Patent and Trademark Office*